Aug. 9, 1955   W. E. TOLLES   2,715,198
EDDY-CURRENT COMPENSATOR
Filed Aug. 14, 1944

INVENTOR
WALTER E. TOLLES
BY
ATTORNEYS

United States Patent Office

2,715,198
Patented Aug. 9, 1955

2,715,198

EDDY-CURRENT COMPENSATOR

Walter E. Tolles, Mineola, N. Y., assignor to the United States of America as represented by the Secretary of the Navy Application August 14, 1944, Serial No. 549,433

2 Claims. (Cl. 317—123)

This invention relates to compensation systems, and more particularly to a system for compensating magnetic fields due to eddy currents.

When magnetically sensitive measuring instruments are mounted in metal-skinned aircraft or other similar carriers, their operation may be greatly impaired by magnetic fields caused by eddy currents flowing in a plane conductor or closed conductive loop lying in a plane, which may form a portion of the metal skin of the carrier. Such currents flow whenever the magnetic flux normal to the plane conductor changes. Thus, whenever the carrier changes its attitude as it moves through the earth's magnetic field, eddy currents are set up in its metal skin and magnetic fields which interfere with the operation of magnetically sensitive instruments are produced.

In order to eliminate the disadvantageous effects of such eddy-current magnetic fields at the location of a magnetically sensitive instrument, in cases in which the orientation of the plane conductor causing the disturbances is known, it is proposed in accordance with the present invention to provide a system for compensating, at a chosen point in relation to a plane conductor, the magnetic fields due to eddy currents flowing in the conductor, comprising a magnetometer arranged to provide an output voltage proportional to the flux normal to the plane conductor, means for differentiating the output of the magnetometer, and means for amplifying the differentiated output and applying it to a coil to produce a magnetic field opposing the field due to eddy currents at the chosen point.

Figure 2:
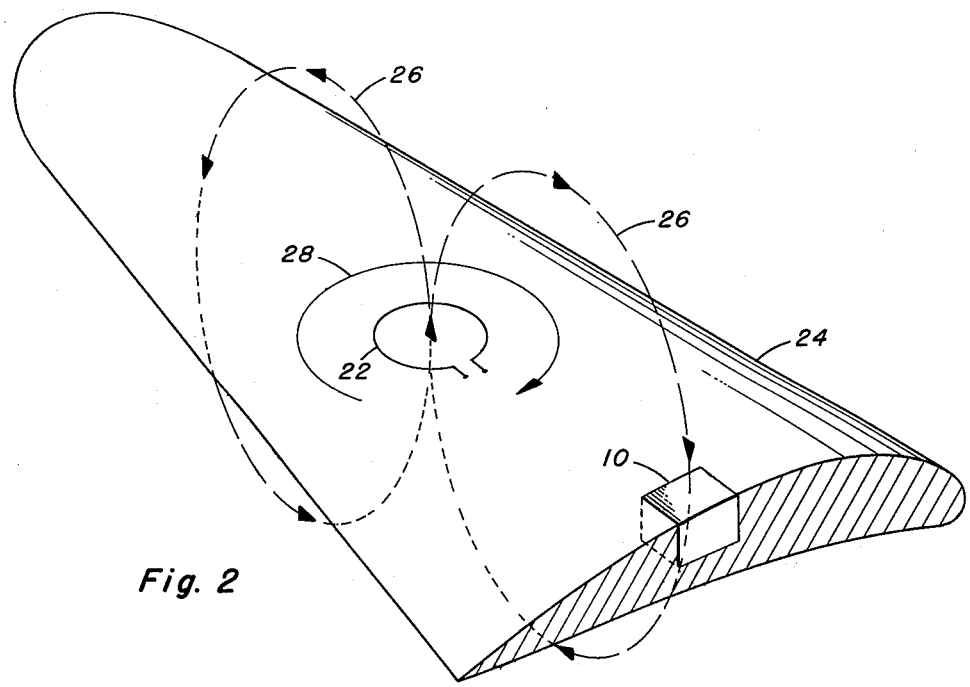
Figure 1:
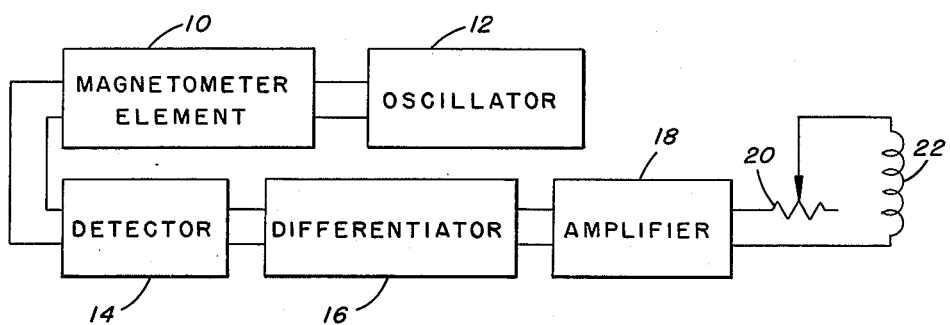

The compensation system of the invention is shown in the accompanying drawings, to which reference is made for a better understanding of the invention and wherein:

Fig. 1 is a schematic representation of the compensation system of the invention, and Fig. 2 is a representation showing one form of mounting relationship of the magnetometer to the compensating coil of the apparatus of Fig. 1 and the relationship of both of these on an aircraft wing, for example, together with illustration of the compensating flux opposing magnetic fields set up by eddy-currents on an aircraft on moving through the earth's magnetic field.

As shown in the drawings, there is provided a magnetometer arranged to measure the flux normal to the plane conductor known to be the cause of a disturbing eddy-current magnetic field. Conveniently, this magnetometer may be of the geenral type disclosed in copending application Serial No. 516,612, filed January 1, 1944, Unbalanced Magnetometers, Otto H. Schmitt, now Patent No. 2,560,132 and comprising unbalanced magnetometer elements 10 driven by an oscillator 12, and a detector 14, arranged to produce an output voltage varying in amplitude and polarity in accordance with variations in the flux along the axis of the magnetometer elements. As used in the present invention, the magnetometer elements are oriented normally to the plane conductor and means are provided for increasing the latitude of the magnetometer system, whereby its output is made linear with respect to the flux over wide ranges. This characteristic is conveniently obtained by means of the system disclosed in the copending application Serial No. 535,159, filed May 11, 1944, Wide-Latitude Magnetometer, James H. Stein, and now abandoned, in accordance with which a portion of the detector output is fed back to the magnetometer elements in a sense tending to reduce the ambient magnetic field at the location of the magnetometer elements.

The output voltage of detector 14 of the magnetometer system is impressed upon the input of differentiator 16, arranged to produce an output voltage proportional to the first time derivative of its input voltage. This differentiator may comprise a simple RC circuit, the time constant of which is chosen in accordance with the expected maneuver frequencies of the carrier in which compensation is to be effected. It will be understood, however, that other differentiating circuits may be substituted if desired.

A consideration of the system thus far described will indicate that the output of detector 14 is a voltage proportional to the magnetic flux normal to the plane conductor causing eddy-current disturbances, while the output of differentiator 16 is a voltage proportional to the rate of change of that flux. Since the eddy currents flowing in the plane conductor are proportional to the rate of change of the magnetic flux normal to the conductor, it will be recognized that the output of differentiator 16 is of the same form as the disturbing magnetic field. The output of differentiator 16 is, therefore, amplified by a suitable amplifier 18 having no phase shift, and is fed through an attenuator 20 to a coil 22. Coil 22 is mounted adjacent the point at which compensation is to be effected, and is so oriented that the magnetic field, caused by the output of amplifier 18, opposes the eddy-current magnetic field at that point. Suitable adjustment of attenuator 20 is made until accurate cancellation of magnetic disturbances is effected.

Referring more particularly to Fig. 2, sensitive magnetometer 10 may be mounted in the wing 24 of an aircraft (not shown) to provide an output voltage proportional to flux normal to the wing plane conductor, this flux occurring due to eddy-currents 28 flowing as a result of change in attitude of the aircraft. Compensating coil 22 is mounted adjacent to magnetometer 10. The field 26 of the coil 22 is such that it opposes the field caused by the eddy-currents 28 in the wing plane conductors.

It will be understood that the expression "plane conductor" as used in this specification and the appended claims refers either to a plane sheet conductor or to a closed conducting loop lying in a plane.

What is claimed is:

1. In a magnetometer system in an aircraft having plane conductors in its structure, means for compensating, at a chosen point in relation to said plane conductors, the magnetic fields due to eddy currents flowing in the plane conductors as a result of a change in attitude of said aircraft, comprising a magnetometer arranged to provide an output voltage proportional to the resulting flux normal to the plane conductor, means for differentiating the output of the magnetometer, means for amplifying the differentiated output, a compensator coil, and means for applying the amplified signal to said coil for producing a magnetic field opposing the field due to said eddy currents at the chosen point.

2. In a magnetometer system in an aircraft having plane conductors in its structure, means for compensating, at a chosen point in relation to said plane conductors, the magnetic fields due to eddy currents flowing in the plane conductors as a result of a change in attitude of said aircraft, comprising a magnetometer arranged to provide an output voltage proportional to the resulting flux normal to the plane conductor, means for differentiating the output of the magnetometer, means for amplifying the differentiated output, a compensator coil, and means for controlling the amplitude of said amplified signal and applying the controlled signal to said coil for producing a magnetic field opposing the field due to said eddy currents at the chosen point.

References Cited in the file of this patent

UNITED STATES PATENTS

| | | |
|---|---|---|
| 1,360,326 | Slepian | Nov. 30, 1920 |
| 2,054,318 | Gunn | Sept. 15, 1936 |
| 2,241,499 | Barth | May 13, 1941 |
| 2,324,718 | Noxon | July 20, 1943 |
| 2,406,870 | Vacquier | Sept. 3, 1946 |
| 2,412,910 | Jenkins | Dec. 17, 1946 |

OTHER REFERENCES

Burt et al.: A. I. E. E. Technical paper 44–7, December 1943, pages 1–4.